United States Patent
Kraft

Patent Number: 5,211,497
Date of Patent: May 18, 1993

[54] CONNECTING DEVICE

[75] Inventor: Karl-Heinz Kraft, Jamestown, N.C.

[73] Assignee: Hafele America Co., Archdale, N.C.

[21] Appl. No.: 659,112

[22] Filed: Feb. 21, 1991

[30] Foreign Application Priority Data

Oct. 31, 1990 [DE] Fed. Rep. of Germany ....... 9014987

[51] Int. Cl.⁵ .............................................. B65D 59/00
[52] U.S. Cl. ......................................... 403/12; 403/6;
403/245; 403/407.1; 403/20
[58] Field of Search ...................... 403/407.1, 12, 6, 7,
403/245, 19, 20

[56] References Cited

U.S. PATENT DOCUMENTS

| | | |
|---|---|---|
| 3,331,623 | 7/1967 | Baresel-Bofinger . |
| 3,485,006 | 12/1969 | De Rozario . |
| 4,127,353 | 11/1978 | Busse . |
| 4,353,663 | 10/1982 | Glickman . |
| 4,518,278 | 5/1985 | Koch . |
| 4,545,698 | 10/1985 | Koch .............................. 403/407.1 X |
| 4,579,474 | 4/1986 | Rock et al. . |
| 4,669,910 | 6/1987 | Koch . |
| 4,797,021 | 1/1989 | Stamper ....................... 403/407.1 |
| 4,869,564 | 9/1989 | Lechman ..................... 403/407.1 X |
| 4,923,321 | 5/1990 | Kriz . |
| 4,957,386 | 9/1990 | Harley et al. . |

Primary Examiner—Andrew V. Kundrat
Attorney, Agent, or Firm—Speckman & Pauley

[57] ABSTRACT

A connecting device for connecting two panels, particularly furniture panels, together in a preliminary position. A casing of the connecting device has an overall cylindrical shape. The casing is capable of receiving a bolt head through an enlarged opening into a hollow interior. A portion of an exterior circumferential side wall has a slot which is opened to only one side. The enlarged opening has an elastic narrowing section in which the width of the opening is less than the largest diameter of the bolt head.

16 Claims, 2 Drawing Sheets

CONNECTING DEVICE

BACKGROUND OF THE INVENTION

1. Field of the Invention

This invention relates to a fitting for a reversible connection of two panels, particularly furniture panels, with a connecting device or tightening device having an approximately cylindrical shape, which admits a bolt head into an opening that leads into a hollow interior of the connecting device. A slot extends along a portion of a circumferential side wall of the connecting device.

2. Description of Prior Art

With conventional rotatable connecting devices, a bolt head is positioned within a casing and then the casing is rotated to tighten the connecting device. One disadvantage of such conventional connecting devices is that furniture panels must be held into position during assembly of the furniture panels, so as to prevent the bolt head from disengaging from within the casing before the casing is rotated to tighten the connecting device.

Another conventional connecting device for furniture parts has two cup-shaped elements. One of the elements has an elastic notch in the shape of a hook. The hook is positioned into a corresponding niche in the other element, thereby enabling a preliminary assembled position between the two elements. However, the hook element can neither be attached to a bolt head nor used to hold a bolt head.

OBJECT OF THE INVENTION

It is one object of this invention to provide a connecting device having a notch mechanism which is used to preliminarily connect two panels together, particularly when the connecting device accommodates a bolt head for the connection.

The above object is achieved with an elastic narrowing section or reduced cross-sectional area section of an opening used for entrance into a hollow interior of the casing. Such reduced opening narrows to a cross-sectional size less than a diameter of a bolt head. When two panels are joined together, the bolt head is inserted into the opening of the hollow interior of the casing. As the bolt head is inserted into the opening, the bolt head forces the elastic narrowing apart to accommodate the larger diameter of the bolt head. As soon as the bolt head passes the elastic narrowing portion, the elastic material resumes its original form in which the cross-sectional area of the elastic narrowing portion is less than the diameter of the bolt head.

Since the bolt head is captured within the hollow interior of the casing and the elastic narrowing returns to a cross-sectional area less than the diameter of the bolt head, the bolt head is thus retained within the hollow interior of the casing. Thus, once the bolt head is retained within the hollow interior, it is not necessary to hold the panels in position during assembly, since the trapped bolt head maintains the two panels in a fixed preliminary position, with respect to each other.

Maintaining the panels in such preliminary position is particularly important when connecting multiple panels. With the connecting device according to this invention, several panels can be preliminarily joined together before they are tightened by rotating the casing of the connecting device to tightly engage the bolt head. Such aspect of this invention enhances the assembly of multiple panels. In one preferred embodiment according to this invention, the elastic narrowing section is accomplished with at least one protrusion, preferably two protrusions, positioned on an interior surface which defines the opening and the hollow interior of the casing.

According to one preferred embodiment of this invention, the elastic narrowing is accomplished with the protrusions being constructed of elastic material. In another preferred embodiment according to this invention, the entire connecting device is constructed of an elastic material and then it is possible for each protrusion to be constructed of either elastic material or inelastic material. According to such embodiments, the entire connecting device, including the casing and the protrusions, can be constructed as an integral piece.

To ensure insertion of the entire bolt head into the hollow interior, each protrusion should be positioned close to an outer edge of the hollow interior. In one preferred embodiment of this invention, each protrusion is shaped as a bulge. According to another preferred embodiment of this invention, each protrusion is positioned on an interior side surface which is directly opposite to front surfaces of the casing of the connecting device. With such positioning, the elastic narrowing is maintained even if a protrusion is damaged or broken, since the elastic narrowing can still be maintained with one of the remaining protrusions.

According to another preferred embodiment of this invention, the narrowed cross-sectional area of the opening of the casing is accomplished with an elastic cover having a U-shaped slot, whereby a longitudinal axis of the U-shaped slot is approximately perpendicular to a rotating axis of the casing of the connecting device. According to one preferred embodiment and for practical purposes, the cover is constructed of sheet metal and bent at an angle. One leg of the angle which has no slot in it is firmly encased into a side wall of the casing of the connecting device. Such cover provides additional strengthening of the casing and the connecting device, and thus prevents distortion.

BRIEF DESCRIPTION OF THE DRAWINGS

The drawings show two preferred embodiments of this invention, wherein.

DESCRIPTION OF PREFERRED EMBODIMENTS

U.S. Pat. No. 4,518,278 teaches a connecting device for detachable connection of two perpendicularly positioned panels, such as furniture panels. The connecting device includes a tightening bolt rotatably mounted in a blind bore of one of the panels. The tightening bolt engages with a head of a fastener bolt and as the tightening bolt is rotated, the fastener bolt is drawn within the tightening bolt to firmly join together the two panels. General teachings of U.S. Pat. No. 4,518,278 apply to this invention and such teachings are incorporated herein by reference.

Figure 1:
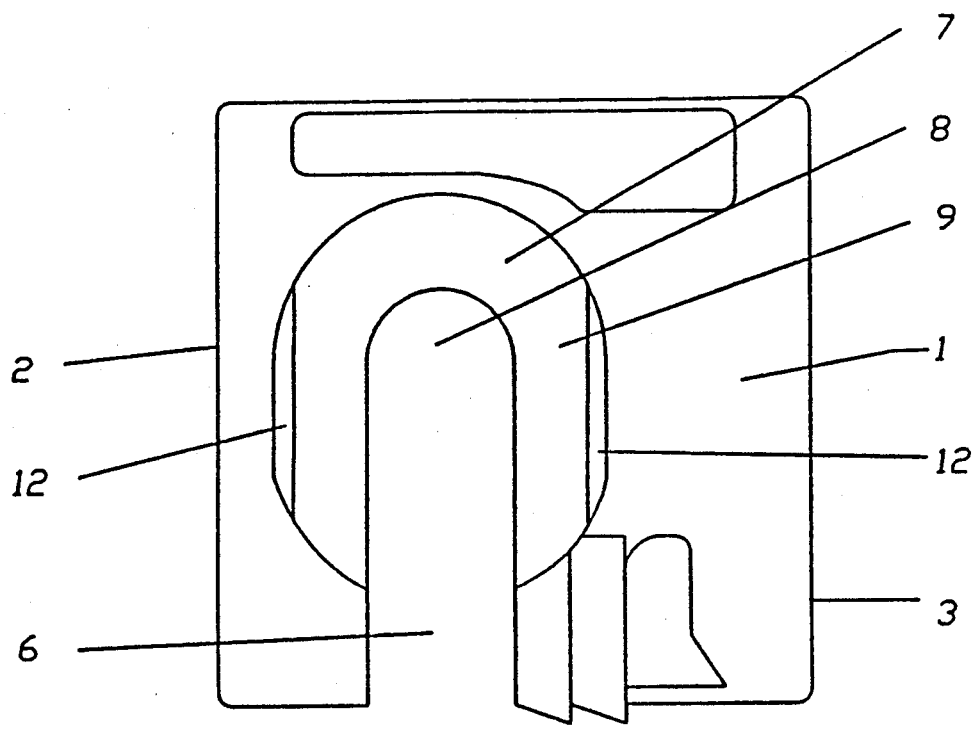
FIG. 1 is a front view of a connecting device, according to one preferred embodiment of this invention.
Figure 2:
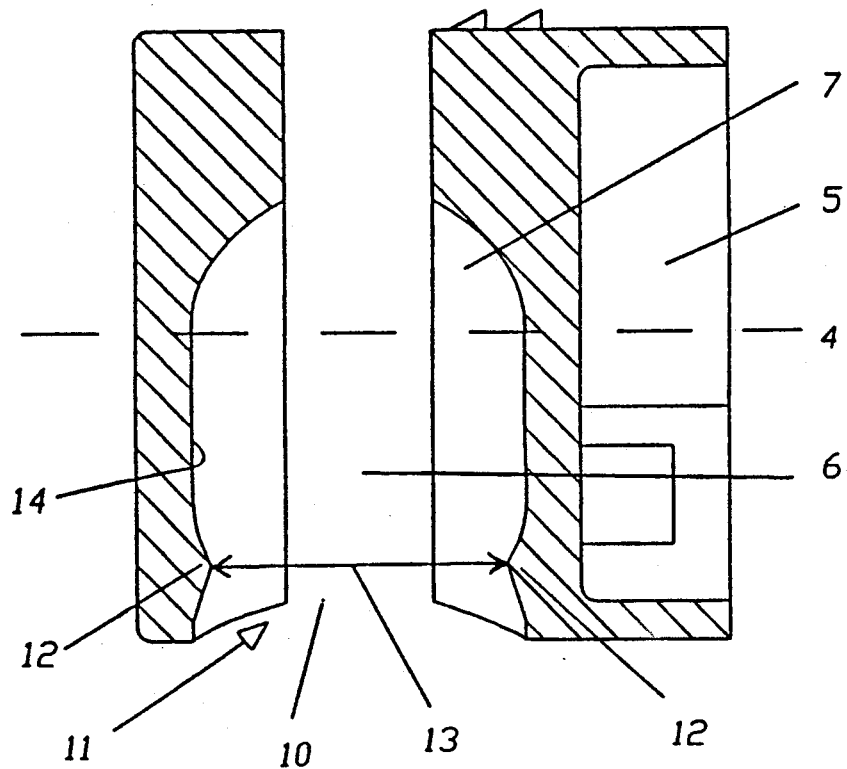
FIG. 2 is a cross-sectional top view along a rotating axis of the connecting device, as shown in FIG. 1.

Referring to FIG. 1 of this invention, an overall cylindrical shaped casing of the connecting device comprises circumferential side wall 1 and two front surfaces 2, 3. Front surface 3 is shaped similar to the surface of a lid. Front surface 3 also has receptacle 5, preferably in the shape of an elongated groove, to accommodate a torquing tool; the torquing tool is not shown in the drawings. Receptacle 5 is centrally positioned with respect to rotating axis 4, as shown in FIG. 2. Side wall 1 has slot 6 which is open to only a portion of side wall 1. Slot 6 extends alongside hollow interior 7 and also proceeds into hollow interior 7. The purpose of slot 6 is to accept a shaft portion of the bolt, just below the bolt head, which is not shown in the drawings, as the casing is rotated into a tightened position. One end 8 of slot 6 leads to a cupped portion 9 of hollow interior 7. Opposite end 10 of slot 6 is a continuation of hollow interior 7 which leads into insertion opening 11 for accommodating the bolt head.

Insertion opening 11 has an elastic narrowing portion formed by at least one protrusion 12. Width 13, shown in FIG. 2 as the distance between protrusions 12, is less than the diameter of the bolt head. In one preferred embodiment according to this invention, two protrusions 12 are positioned on an interior side surface 14 which defines hollow interior 7. Each of the two protrusions 12 is preferably positioned opposite from a respective front surface 2, 3.

When joining two panels together, the bolt is positioned within insertion opening 11 and is then forced beyond the elastic narrowing of at least one protrusion 12. As the bolt head moves beyond protrusions 12, width 13 of the elastic narrowing is increased allowing the bolt head to be forced beyond protrusions 12 and within hollow interior 7. Once the bolt head moves beyond the elastic narrowing, of the elastic narrowing returns to its original position and width 13 returns to its original dimension, which is less than the diameter of the bolt head. Thus, the bolt head is secured within hollow interior 7, and the two panels are mounted in their preliminary position with respect to each other. Such preliminary position facilitates assembly of multiple panels without having to tighten each connecting device until a later phase of installation.

Figure 3:
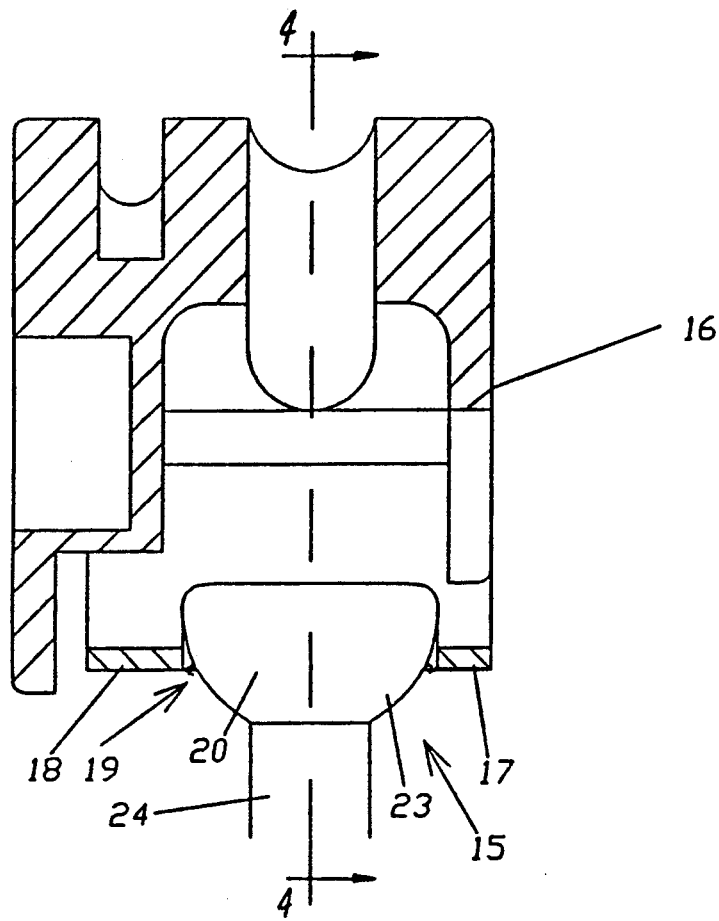
FIG. 3 is another cross-sectional view of the connecting device, with a bolt head portion of a bolt shown.
Figure 4:
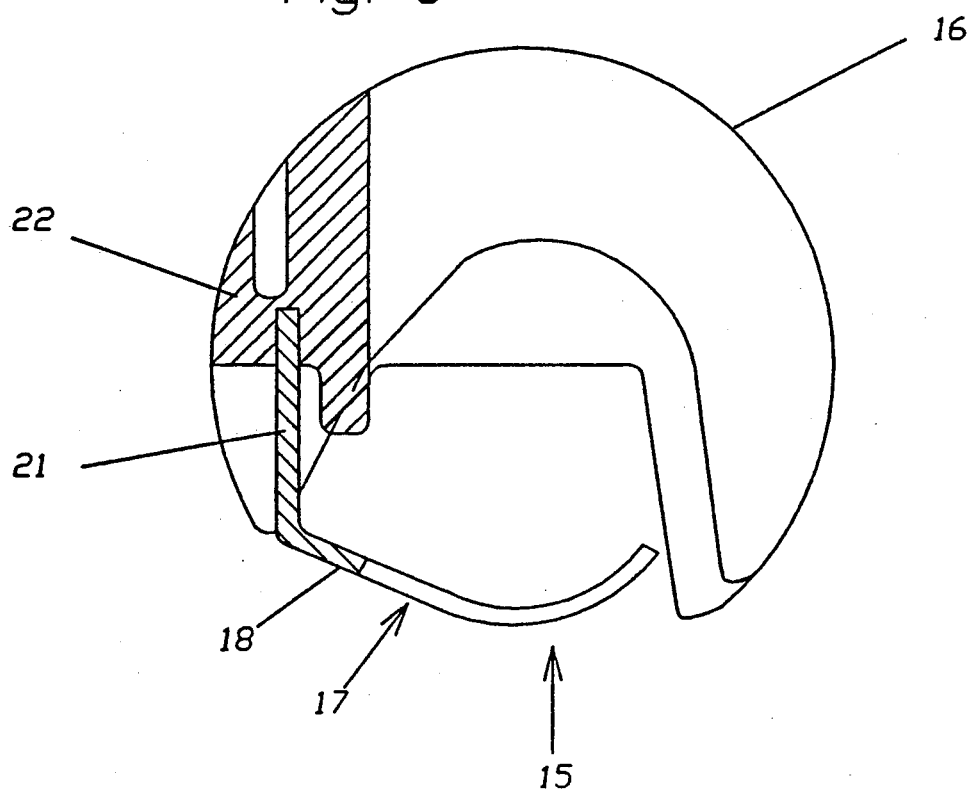
FIG. 4 is a cross-sectional view of the connecting device, along line 4—4 as shown in FIG. 3, but without the bolt head shown.

In another preferred embodiment according to this invention, as shown in FIGS. 3 and 4, insertion opening 15 of casing 16 is reduced with a flexible piece of sheet metal 17, or other suitable flexible material, which is constructed as a cover for opening 15. Sheet metal 17 forms an angle whereby one leg 18 of angled sheet metal 17 is positioned over opening 15 and conforms to the shape of casing 16, through a slight curvature or bend. Leg 18 preferably has a U-shaped slot 19. Width 20 of U-shaped slot 19 defines the elastic narrowing of opening 15 whereby, as bolt head 23 of bolt 24 is moved into U-shaped slot 19, the legs of U-shaped slot 19 are forced apart, increasing width 20 of the elastic narrowing, and when bolt head 23 has moved past the elastic narrowing, width 20 of the elastic narrowing returns to its original position, thereby retaining bolt head 23 within U-shaped slot 19. U-shaped slot 19 has a longitudinal axis which is approximately at a 90° angle with respect to the rotating axis of casing 16. The other angled leg 21 of sheet metal 17 is secured within side wall 22 of casing 16 and further strengthens it to prevent distortion. FIG. 3 also shows the preliminary connecting position of bolt head 23 of bolt 24.

I claim:

1. A connecting device for preliminarily holding two panels together prior to rotating the connecting device within a bore of one of the panels to engage a bolt head and thereby tighten the panels with respect to each other, the connecting device comprising:

a generally cylindrical casing having two flat opposing surfaces, a circumferential side wall, and a hollow interior large enough to accommodate the bolt head; said casing having an opening for accepting the bolt head, said circumferential side wall having a slot along a portion of said circumferential side wall, said slot proceeding into said hollow interior, said opening being wider than said slot and wider than a head diameter of the bolt head, said slot being narrower than said head diameter, a slot longitudinal axis of said slot being perpendicular to a rotating axis of said casing;

at least one protrusion positioned on an interior side surface of said casing which defines said opening, said interior side surface forming an elastic narrowing of said opening, and a greatest width of said elastic narrowing being less than said head diameter.

2. A connecting device according to claim 1 wherein two said protrusions are on opposing sides of said opening.

3. A connecting device according to claim 2 wherein said protrusions are positioned opposite of said flat surfaces.

4. A connecting device according to claim 1 wherein each said protrusion is of elastic material.

5. A connecting device according to claim 1 wherein said casing is of elastic material.

6. A connecting device according to claim 1 wherein each said protrusion is positioned near an outer edge of said opening.

7. A connecting device according to claim 1 wherein a portion of said hollow interior opposite said opening is cupped.

8. In a connecting device for preliminarily holding two panels together prior to rotating the connecting device within a bore of one of the panels to engage a bolt head and thereby tighten the panels with respect to each other, the connecting device having a generally cylindrical casing and a hollow interior large enough to accommodate the bolt head, the casing having an opening for accepting the bolt head, and when rotated the casing drawing the bolt head within the hollow interior to tighten both panels with respect to each other, the improvement comprising:

at least one protrusion positioned on an interior side surface of said casing which defines said opening, said interior side surface forming an elastic narrowing of the opening, and a greatest width of said elastic narrowing being less than a head diameter of the bolt head.

9. A connecting device according to claim 8 wherein two said protrusions are on opposing sides of the opening.

10. A connecting device according to claim 8 wherein said protrusions are positioned opposite of flat surfaces of the cylindrical casing.

11. A connecting device according to claim 8 wherein each said protrusion is of elastic material.

12. A connecting device according to claim 8 wherein said casing is of elastic material.

13. A connecting device according to claim 8 wherein each said protrusion is positioned near an outer edge of the opening.

14. A connecting device for preliminarily holding two panels together prior to rotating the connecting device within a bore of one of the panels to engage a bolt head and thereby tighten the panels with respect to each other, the connecting device comprising:

a generally cylindrical casing having two flat opposing surfaces, a circumferential side wall, and a hollow interior large enough to accommodate the bolt head; said casing having an opening for accepting the bolt head, said circumferential side wall having a slot along a portion of said circumferential side wall, said slot proceeding into said hollow interior, said opening being wider than said slot and wider than a head diameter of the bolt head, said slot being narrower than said head diameter, a first longitudinal axis of said slot being perpendicular to a rotating axis of said casing;

an elastic cover comprising an angled strip of sheet material having a first leg portion and a second leg portion, said first leg portion secured to said casing, said second leg portion having a U-shaped slot, a second longitudinal axis of said U-shaped slot being approximately perpendicular to said rotating axis, said U-shaped slot forming an elastic narrowing of said opening, and a greatest width of said elastic narrowing being less than said head diameter.

15. A connecting device according to claim 14 wherein said casing is of elastic material.

16. A connecting device according to claim 15 wherein a portion of said hollow interior opposite said opening is cupped.

* * * * *